United States Patent
Liu et al.

(10) Patent No.: US 11,940,557 B2
(45) Date of Patent: Mar. 26, 2024

(54) OBJECT DETECTION DEVICE, OBJECT DETECTION SYSTEM, AND OBJECT DETECTION METHOD

(71) Applicant: Panasonic Corporation, Osaka (JP)

(72) Inventors: Weijie Liu, Tokyo (JP); Makoto Yasugi, Tokyo (JP); Yoichi Nakagawa, Tokyo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 823 days.

(21) Appl. No.: 17/044,652

(22) PCT Filed: Mar. 28, 2019

(86) PCT No.: PCT/JP2019/013640
§ 371 (c)(1),
(2) Date: Oct. 1, 2020

(87) PCT Pub. No.: WO2019/198532
PCT Pub. Date: Oct. 17, 2019

(65) Prior Publication Data
US 2021/0103029 A1    Apr. 8, 2021

(30) Foreign Application Priority Data
Apr. 11, 2018   (JP) ................. 2018-076081

(51) Int. Cl.
*G01S 7/41* (2006.01)
*G01S 13/00* (2006.01)
*G01S 13/91* (2006.01)

(52) U.S. Cl.
CPC .............. *G01S 7/41* (2013.01); *G01S 13/003* (2013.01); *G01S 13/91* (2013.01)

(58) Field of Classification Search
CPC ........... G01S 7/40; G01S 13/003; G01S 13/91
See application file for complete search history.

(56) References Cited

U.S. PATENT DOCUMENTS

| 5,448,243 A | * | 9/1995 | Bethke | .................... G01S 13/87 342/36 |
| 2005/0140540 A1 | * | 6/2005 | Rees | ..................... G08G 5/065 342/36 |

(Continued)

FOREIGN PATENT DOCUMENTS

| JP | 2008-286582 | 11/2008 |
| WO | 95/07473 | 3/1995 |

OTHER PUBLICATIONS

International Search Report (ISR) from International Searching Authority (Japan Patent Office) in International Pat. Appl. No. PCT/JP2019/013640, dated Jun. 25, 2019, along with an English language translation thereof.

(Continued)

*Primary Examiner* — Marcus E Windrich
(74) *Attorney, Agent, or Firm* — GREENBLUM & BERNSTEIN, P.L.C.

(57) ABSTRACT

A processor in an object detection device is configured to: acquire settings data for one or more radar grids, each radar grid being set for a measurement area of a corresponding radar and consisting of radar cells; acquire settings data for a processing grid for clustering operations, the processing grid being set for the one or more measurement areas and consisting of processing cells; calculate, for each processing cell, one or more likelihoods associated with measurements of one or more related radar cells based on distances between the processing cell and the one or more related radar cells; calculate a grid value of each of the processing cells in the processing grid based on the one or more likelihoods; and perform a clustering operation on each processing cell based on distances between and/or grid values of the processing cell and one or more different processing cells.

12 Claims, 14 Drawing Sheets

(56) References Cited

U.S. PATENT DOCUMENTS

| | | | | |
|---|---|---|---|---|
| 2010/0149020 A1* | 6/2010 | Arnold | ...................... | G08G 1/08 |
| | | | | 342/90 |
| 2012/0286103 A1* | 11/2012 | Hilleary | .................. | B61L 29/30 |
| | | | | 342/173 |
| 2014/0152490 A1* | 6/2014 | Lehning | ................ | G01S 7/4004 |
| | | | | 342/169 |
| 2016/0097849 A1* | 4/2016 | Nichols | ................ | G08G 1/0175 |
| | | | | 342/107 |
| 2018/0068562 A1* | 3/2018 | Ho | ........................... | G08G 1/04 |
| 2019/0331790 A1* | 10/2019 | Ben Khadhra | ......... | G01S 7/025 |

OTHER PUBLICATIONS

Kellner et al., "Grid-based DBSCAN for clustering extended objects in radar data", Intelligent Vehicles Symposium, 2012, pp. 365-370, along with a concise explanation of relevance.

Extended European Search Report from European Patent Office (EPO) in European Patent Appl. No. 19784717.1, dated May 18, 2021.

* cited by examiner

OBJECT DETECTION DEVICE, OBJECT DETECTION SYSTEM, AND OBJECT DETECTION METHOD

TECHNICAL FIELD

The present invention relates to an object detection device, an object detection system, and an object detection method for detecting an object based on measurement records of one or more radars.

BACKGROUND ART

Technologies which have developed for the purpose of preventing traffic accidents and other related problems, include detection of an object such as a vehicle or a pedestrian by sensors installed on roads or other places. Such sensors includes a radar, which is less affected by weather or other factors than other sensing devices such as cameras and is capable of measuring a distance to an object, as well as an angle, a relative speed, and other physical quantities with respect to the object. When a radar is used, the radar acquires a plurality of measurement points (reflection points) for one detection target, and thus a clustering operation is performed so as to associate these measurement points with the detection target.

As a method of such a clustering operation, DBSCAN (Density-Based Spatial Clustering of Applications with Noise) is commonly used as a clustering algorithm (Non-Patent Document 1).

In some known technologies, one or more radars are used and clustering operations are performed on measurement points acquired by those radars, and examples of such technologies include a radar signal processing device configured to calculate synthetic relative velocity vectors of a plurality of virtual objects, each virtual object including a measurement point, based on relative velocities detected at the respective measuring points; and to group a set of some virtual objects among the plurality of virtual objects such that, for the grouped virtual objects, the same synthetic relative velocity vector is calculated (Patent Document 1).

PRIOR ART DOCUMENT(S)

Patent Document(s)

Non-Patent Document 1: D. Kellner, J. Klappstein and K. Dietmayer, "Grid-based DBSCAN for clustering extended objects in radar data", Intelligent Vehicles Symposium 2012, pp. 365-370

Patent Document 1: JP2008-286582A

SUMMARY OF THE INVENTION

Task to be Accomplished by the Invention

Clustering operations using the above-described DBSCAN involve a problem that, in the case where a target area of the clustering operation includes measurement points of two or more radars having different measurement areas which overlap each other (which means that the radars can detect the same object simultaneously), when the spatial resolutions of the two or more radars are different from each other at a common location in their measurement areas, it becomes difficult to properly set parameters for a clustering operation (ε,minPts).

The above-described prior art of Patent Document 1 includes an embodiment in which two or more radars are provided on both the right and left sides in the front of a vehicle so as to acquire the detection results (relative velocity vector components on the left and right sides) for the same location of a virtual object, thereby enabling calculation of a synthetic relative velocity vector of the virtual object. However, when two radars are arranged to face each other at an intersection so as to detect the same object from the different directions (e.g., front-to-rear and rear-to-front directions) of the object, one radar can detect only one side (e.g. front side) of the object and the other can detect only the opposite side (e.g. rear side), which means that it become difficult for these radars to share a common measurement point of their same measurement target.

The present invention has been made in view of such problems of the prior art, and a primary object of the present invention is to provide an object detection device, an object detection system, and an object detection method, which ensure that a clustering operation can be properly performed on measurement records of radars.

Means to Accomplish the Task

An aspect of the present invention provides an object detection device comprising a processor configured to perform an operation for detecting an object based on measurement records of one or more radars, wherein the processor is configured to: acquire settings data for one or more radar grids for measurement, each radar grid being set for a measurement area of a corresponding one of the radars and consisting of a plurality of radar cells; acquire settings data for a processing grid for clustering operations, the processing grid being set for the one or more measurement areas of the one or more radars and consisting of a plurality of processing cells; calculate, for each processing cell, one or more likelihoods associated with measurements of one or more related radar cells based on distances between the processing cell and the one or more related radar cells; calculate a grid value of each of the processing cells based on the one or more likelihoods; and perform a clustering operation on each processing cell based on (i) distances between the processing cell and one or more different processing cells, and/or (ii) the grid values of the processing cell and the one or more different processing cells.

Another aspect of the present invention provides an object detection system comprising: the object detection device according to any one of claims 1 to 8; and the one or more radars.

Yet another aspect of the present invention provides an object detection method performed by an object detection device configured to perform an operation for detecting an object based on measurement records of one or more radars, the method comprising: acquiring settings data for one or more radar grids for measurement, each radar grid being set for a measurement area of a corresponding one of the radars and consisting of a plurality of radar cells; acquiring settings data for a processing grid for clustering operations, the processing grid being set for the one or more measurement areas of the one or more radars and consisting of a plurality of processing cells; calculating, for each processing cell, one or more likelihoods associated with measurements of one or more related radar cells based on distances between the processing cell and the one or more related radar cells; calculating a grid value of each of the processing cells based on the one or more likelihoods; and performing a clustering operation on each processing cell based on (i) distances between the processing cell and one or more different processing cells, and/or (ii) the grid values of the processing cell and the one or more different processing cells.

Effect of the Invention

According to the present disclosure, a clustering operation can be properly performed on measurement records of radars, which enables easy detection of an object to be detected.

DESCRIPTION OF THE PREFERRED EMBODIMENT(S)

Figure 1:
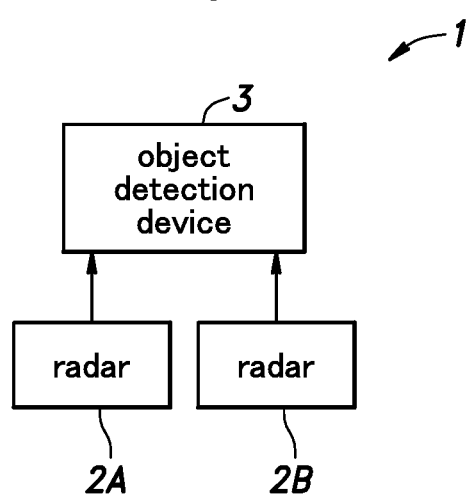
FIG. 1 is a diagram showing a general configuration of an object detection system 1 according to a first embodiment of the present invention.

A first aspect of the present invention made to achieve the above-described object is an object detection device comprising a processor configured to perform an operation for detecting an object based on measurement records of one or more radars, wherein the processor is configured to: acquire settings data for one or more radar grids for measurement, each radar grid being set for a measurement area of a corresponding one of the radars and consisting of a plurality of radar cells; acquire settings data for a processing grid for clustering operations, the processing grid being set for the one or more measurement areas of the one or more radars and consisting of a plurality of processing cells; calculate, for each processing cell, one or more likelihoods associated with measurements of one or more related radar cells based on distances between the processing cell and the one or more related radar cells; calculate a grid value of each of the processing cells based on the one or more likelihoods; and perform a clustering operation on each processing cell based on (i) distances between the processing cell and one or more different processing cells, and/or (ii) the grid values of the processing cell and the one or more different processing cells.

This configuration performs a clustering operation on processing cells based on grid values, the grid values being obtained in relation to likelihoods which are calculated based on distances between each processing cell and related radar cells. As a result, a proper clustering operation can be performed on measurement records of radars.

A second aspect of the present invention is the base station device of the first aspect, wherein the processor configured such that, when a plurality of likelihoods are calculated for a processing cell based on distances between the processing cell and related radar cells, the processor calculates a maximum value of the plurality of likelihoods as the grid value of the processing cell.

In this configuration, even when measurement records of one or more radars are used to detect a single object, a proper clustering operation can be performed on measurement records of the radars.

A third aspect of the present invention is the base station device of the first aspect, wherein the processor configured such that, when a plurality of likelihoods are calculated, for a processing cell, based on distances between the processing cell and related radar cells, the processor calculates a sum of the plurality of likelihoods as the grid value of the processing cell.

In this configuration, even when measurement records of one or more radars are used to detect a single object, a proper clustering operation can be performed on measurement records of the radars.

A fourth aspect of the present invention is the base station device of any of the first to third aspects, wherein the processor configured to calculate the one or more likelihoods associated with the measurements of the one or more radar cells based on radar reflection intensity measurements associated with the respective radar cells.

This configuration ensures that likelihoods associated with measurement records of each radar cell can be properly calculated based on radar reflection intensity measurements.

A fifth aspect of the present invention is the base station device of any of the first to third aspects, wherein the processor configured to calculate the one or more likelihoods associated with the measurements of the one or more radar cells based on radar Doppler velocities associated with the respective radar cells.

This configuration ensures that likelihoods associated with measurement records of each radar cell can be properly calculated based on radar Doppler velocities.

A sixth aspect of the present invention is the base station device of any of the first to fifth aspects, wherein the processor configured to perform the clustering operation based on a difference between two grid values of a pair of processing cells to be subjected to the clustering operation.

This configuration enables a proper clustering operation to be performed based on a difference between two grid values of a pair of processing cells.

A seventh aspect of the present invention is the base station device of any of the first to sixth aspects, wherein the distance between each of the radar cells and a processing cell is a distance between the centers of the radar cell and the processing cell.

This configuration enables easy and proper calculation of distances between each radar cell and related processing cells.

An eighth aspect of the present invention is the base station device of any of the first to seventh aspects, wherein each radar grid is formed based on polar coordinates, and wherein the processing grid is formed based on orthogonal coordinates.

This configuration enables proper setting of a radar grid for measurement and a processing grid for clustering operations.

A ninth aspect of the present invention is an object detection system comprising: the base station device of any of the first to eighth aspects; and the one or more radars.

This configuration performs a clustering operation on processing cells based on grid values, the grid values being obtained in relation to likelihoods which are calculated based on distances between each processing cell and related radar cells. As a result, a proper clustering operation can be performed on measurement records of radars.

A tenth aspect of the present invention is the base station system of the ninth aspect, wherein the one or more radars are installed on roads.

This configuration enables accurate detection of persons and vehicles passing through the road, thereby allowing users to grasp accurate traffic states situations.

An eleventh aspect of the present invention is the base station system of the ninth or tenth aspect, wherein the one or more radars consist of a plurality of radars arranged side by side so as to have a same reference emission direction, and wherein the plurality of processing cells forming the processing grid increase in size with distance from the one or more radars in the one or more measurement areas.

In this configuration, for a plurality of radars arranged side by side so as to have a same reference emission direction, radar grids for measurement and a processing grid for clustering operations can be properly set.

A twelfth aspect of the present invention is an object detection method performed by an object detection device configured to perform an operation for detecting an object based on measurement records of one or more radars, the method comprising: acquiring settings data for one or more radar grids for measurement, each radar grid being set for a measurement area of a corresponding one of the radars and consisting of a plurality of radar cells; acquiring settings data for a processing grid for clustering operations, the processing grid being set for the one or more measurement areas of the one or more radars and consisting of a plurality of processing cells; calculating, for each processing cell, one or more likelihoods associated with measurements of one or more related radar cells based on distances between the processing cell and the one or more related radar cells; calculating a grid value of each of the processing cells based on the one or more likelihoods; and performing a clustering operation on each processing cell based on (i) distances between the processing cell and one or more different processing cells, and/or (ii) the grid values of the processing cell and the one or more different processing cells.

This configuration performs a clustering operation on processing cells based on grid values, the grid values being obtained in relation to likelihoods which are calculated based on distances between each processing cell and related radar cells. As a result, a proper clustering operation can be performed on measurement records of radars.

Embodiments of the present invention will be described below with reference to the drawings. In the present application, different character suffixes after the same reference numeral (e.g. A and B in "radars 2A and 2B") are used to distinguishably identify equivalent elements, and only a reference numeral (e.g. 2 in "radars 2") is used to collectively identify the equivalent elements.

First Embodiment

FIG. 1 is a diagram showing a general configuration of an object detection system 1 according to a first embodiment of the present invention.

An object detection system 1 includes a plurality of radars 2A and 2B, and an object detection device 3 as primary components. The object detection device 3 is configured to perform an operation for detecting an object to be detected (hereinafter, referred to as "object detection operation") based on measurement records acquired from the radars 2A and 2B.

The radars 2 emit radio waves, and can be used to detect an object located around the radar devices and measure t a distance to an object, as well as an angle, a relative speed, and other physical quantities with respect to the object. An example of type of radar used as the radars 2 may be, but not limited to, 79 GHz band millimeter wave radars, and other types of radar (e.g. laser radar) may be used as the radars 2. The object detection system 1 suitably uses measurement records acquired from the plurality of radars 2, but may be configured to have a single radar 2.

The object detection device 3 is an information processing device including a computer having known hardware. The object detection device 3 is connected to the radars 2 via a known communication cable or a communication network, and is capable of acquiring measurement records provided from the radars 2. Examples of measurement records include measurement values (for example, binary values of 0 and 1) at each location (measurement point) in a measurement area of a radar 2.

Figure 2:
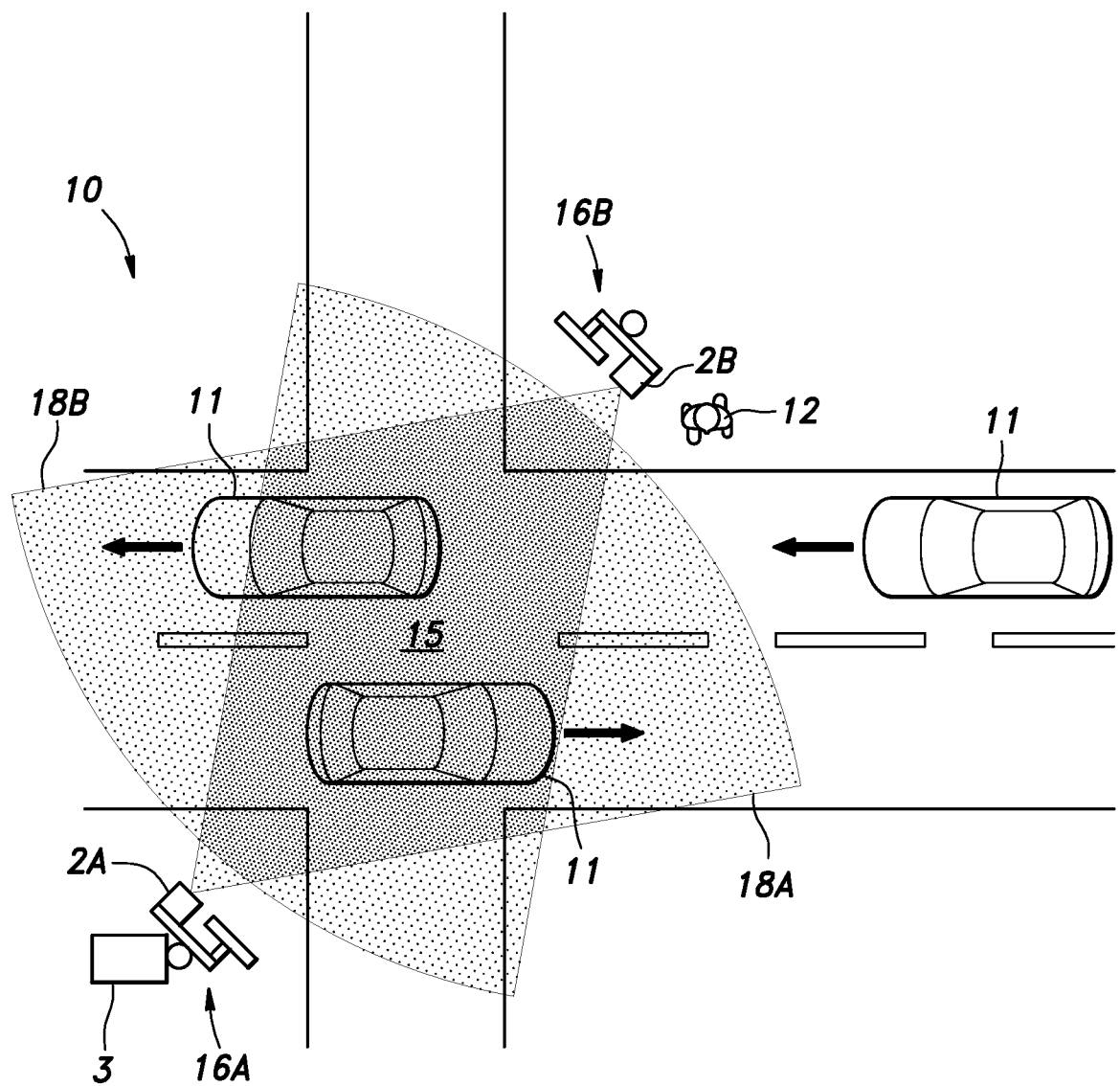
FIG. 2 is an explanatory diagram showing an example of use of the object detection system 1 according to the first embodiment.

FIG. 2 is an explanatory diagram showing an example of use of the object detection system 1 according to the first embodiment.

For example, as shown in FIG. 2, the object detection system 1 can detect moving objects (detection targets) such as vehicles 11 or a pedestrian 12 passing through a road 10 based on measurement records acquired from radars 2A and 2B installed near an intersection along the road 10.

The radars 2A and 2B are arranged, for example, at diagonal corners (i.e., opposite corners) of a crossroad 15. In the present embodiment, the radars 2A and 2B are placed in known roadside apparatuses 16A and 16B which can communicate with in-vehicle devices. The radars 2A and 2B have substantially fan-shaped measurement areas 18A and 18B, respectively, which are directed toward the center of the crossroad 15. The measurement areas 18A and 18B are set such that the measurements areas at least partially overlap each other (a dark shaded area in FIG. 2), enabling simultaneous detection of moving objects at common locations.

The object detection device 3 is installed in the roadside apparatus 16A. The object detection device 3 detects moving objects based on measurement records acquired from the radars 2A and 2B, and also can detect moving objects based on measurement records acquired from only one of the radars (e.g., the radar 2A). In some cases, the object detection device 3 may be provided integrally with a radar 2. Moreover, the object detection device 3 may be placed in a remote monitoring facility, a traffic control center, or other facilities.

The object detection system 1 is used for not limited to the detection of moving objects traveling on a road, but also can be used for the detection of moving objects in any facility or transportation.

Figure 3:
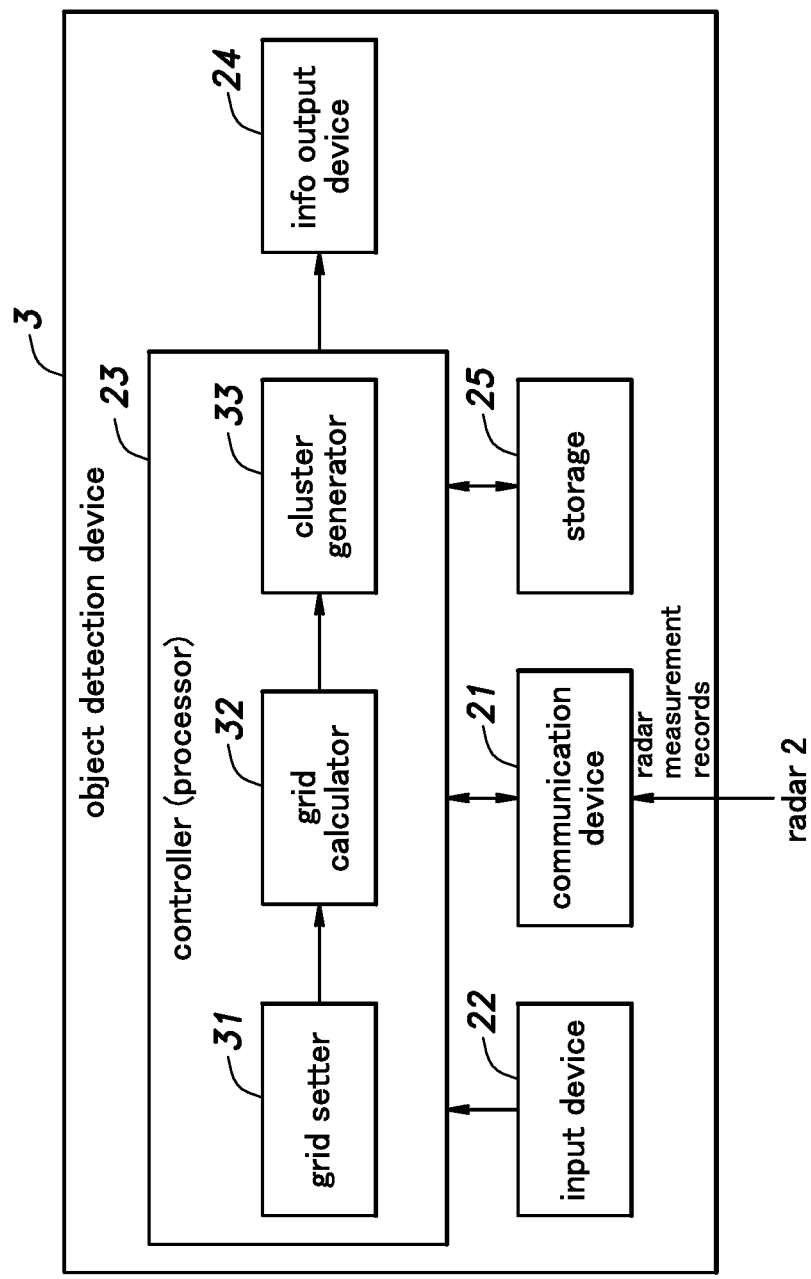
FIG. 3 is a block diagram showing a schematic configuration of the object detection device 3 according to the first embodiment.
Figure 4:
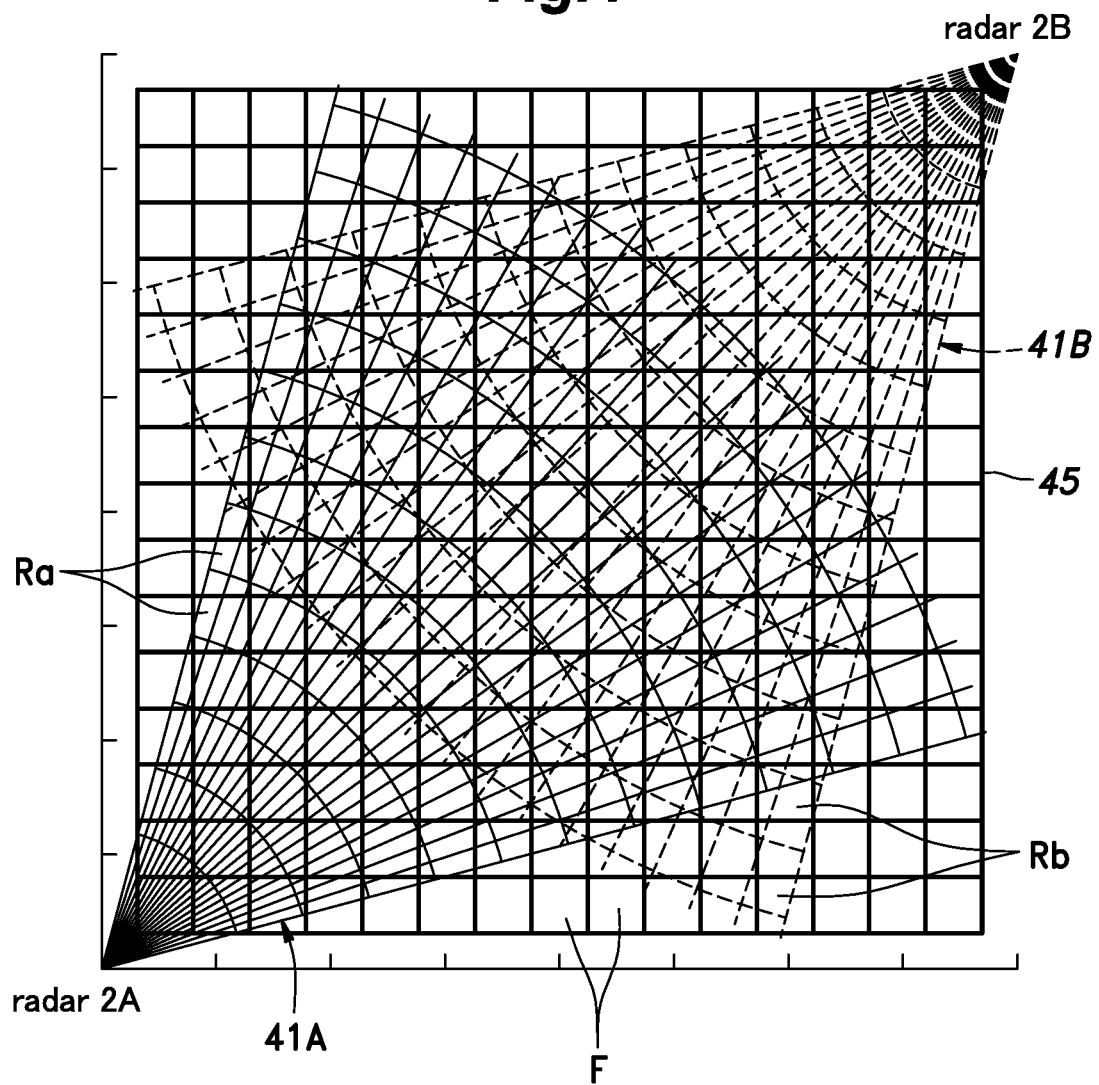
FIG. 4 is an explanatory diagram showing examples of grids which are set for measurement areas of radars 2 according to the first embodiment.

FIG. 3 is a block diagram showing a schematic configuration of the object detection device 3 according to the first embodiment. FIG. 4 is an explanatory diagram showing examples of grids (radar grids 41A and 41B for measurement and a processing grid 45 for clustering operations) which are set for measurement areas of the radars 2.

In the object detection device 3, a communication device 21 is provided with a communication interface for acquiring measurement records from the radars 2. An input device 22 includes a known input device such as a keyboard and a mouse, and enables a user (operator) of the object detection device 3 to enter various data or information and perform a setting operation related to an object detection operation.

A controller 23 includes a processor and performs processing operations such as object detection operations and acquisition of measurement records from the radars 2. As will be described in detail later, in the controller 23, a grid setter 31 acquires and generates settings data for grids for measurement (hereinafter, referred to as "radar grids") which are set for the measurement areas 18A and 18B for the radars 2A and 2B, respectively. The settings data for the radar grids include location data (locations data of measurement points) in the radar grids and other data. Furthermore, the grid setter 31 acquires and generates settings data for a grid for clustering operations (hereinafter, referred to as "processing grid") set for the measurement areas. The settings data for the processing grid include location data of measurement points (location data of clustering target points associated with the measurement points) in the processing grid.

As shown in FIG. 4, the radar grids 41A and 41B of the radars 2A and 2B are set based on polar coordinates, and have a substantially fan-shaped areas, which correspond to the measurement areas 18A and 18B, respectively. Each of the radar grids 41A and 41B is comprised primarily of a plurality of straight lines extending radially outwardly from a corresponding radar 2A or 2B at prescribed angles relative to one another; and a plurality of arcs arranged at different radii from the corresponding radar 2A or 2B, so that each radar grid 41A or 41B includes a plurality of cells Ra or Rb (hereinafter, referred to as "radar cells") defined by the straight lines and the arcs.

The processing grid 45 is set based on orthogonal coordinates, and is composed primarily of a plurality of vertical lines extending in the vertical direction at prescribed intervals; and a plurality of horizontal lines extending in the horizontal direction at prescribed intervals, so that the processing grid 4 includes a plurality of cells F (hereinafter, referred to as "processing cells") defined by the vertical lines and the horizontal lines. The processing grid 45 is a grid determined for processing operations using a DBSCAN algorithm described later.

The size of each radar cell R (the vertical and horizontal lengths of a substantially rectangular shape) can be set in the range of several cm to 10 cm, for example. The size of each processing cell F having a rectangular or square shape can be set in the range of 10 cm to 50 cm, for example. However, the configurations of a radar grid 41 and a processing grid 45 (including the size and shape of each cell) can be changed as appropriate.

Referring back to FIG. 3, a grid value calculator 32 in the controller 23 calculates a value (hereinafter, referred to as "grid value") for each processing cell F used in the clustering operations based on measurement records of the radars 2. As will be described later in detail, the grid value calculator 32 calculates such a grid value from the measurement records of the radar 2 (i.e., likelihoods associated with measurements of related radar cells R). A cluster generator 33 performs a clustering operation on each processing cell F (clustering target point).

The cluster generator 33 performs clustering operations according to a well-known DBSCAN (Density-Based Spatial Clustering of Applications with Noise) algorithm. However, a clustering operation of the present disclosure involves neighborhood calculation by using not only distances between a processing cell F and different related processing cells F, but also grid values of the processing cell and the related processing cells F, the grid values being calculated by the grid value calculator 32 described above. The neighborhood calculation in a DBSCAN determines (extracts) core points (processing cell F) each having at least minPts neighboring points (minimum number of points) within a radius s (Eps-neighborhood of that point); and points (processing cell F) having at least one core point within the radius ε.

The above-described processing operations performed by the grid setter 31, the grid value calculator 32, and the cluster generator 33 can be implemented by the processor executing prescribed programs.

An information output device 24 includes a known display device such as a liquid crystal display, and displays various information related to object detection operations and operation results thereof.

A storage 25 includes a known storage device, and can store programs executable by the processor, various types of information related to object detection operations, and operations results thereof.

Figure 5:
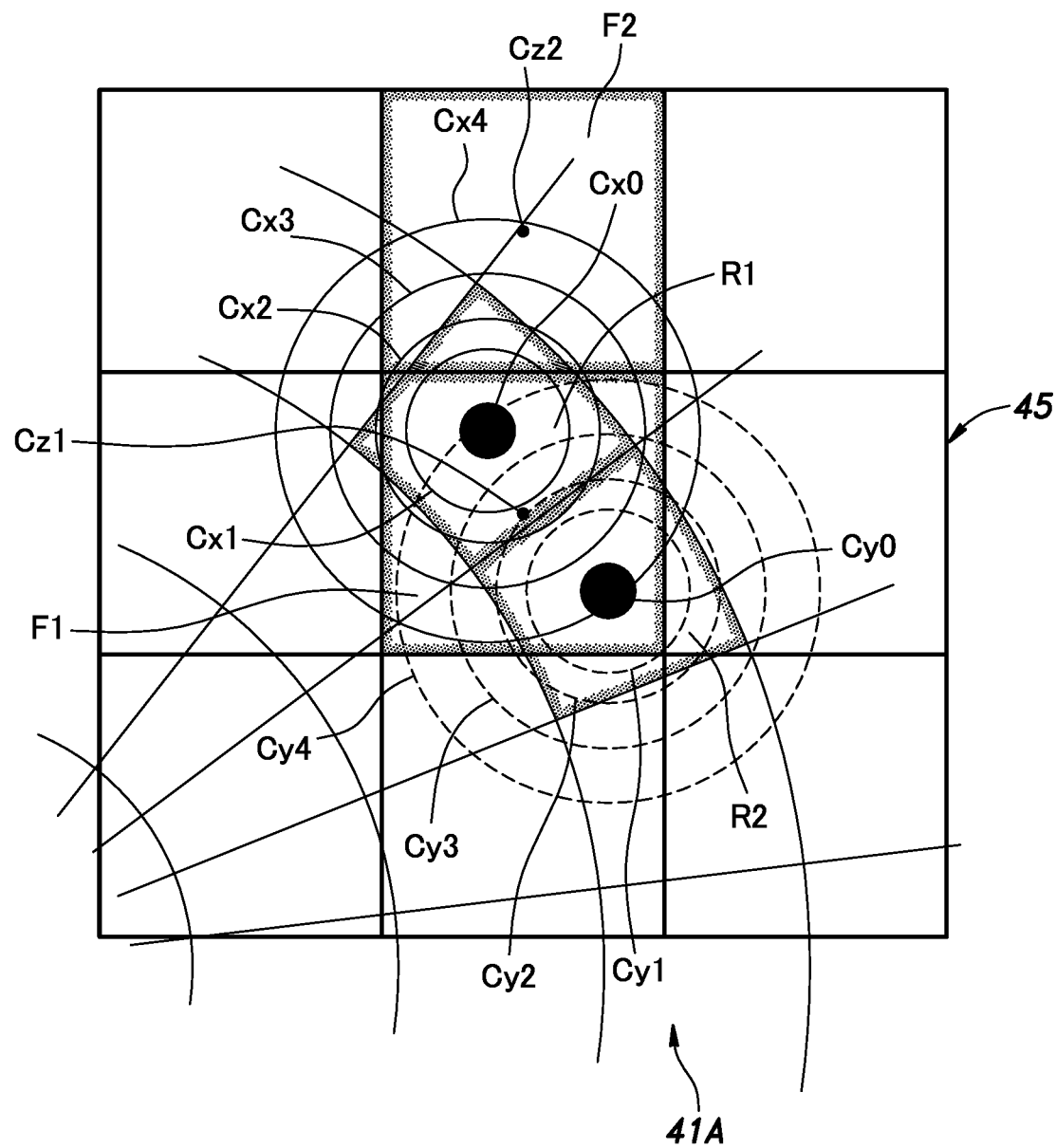
FIG. 5 is an explanatory diagram showing an example of a method of likelihood calculation performed by the object detection device 3 according to the first embodiment.
Figure 6:
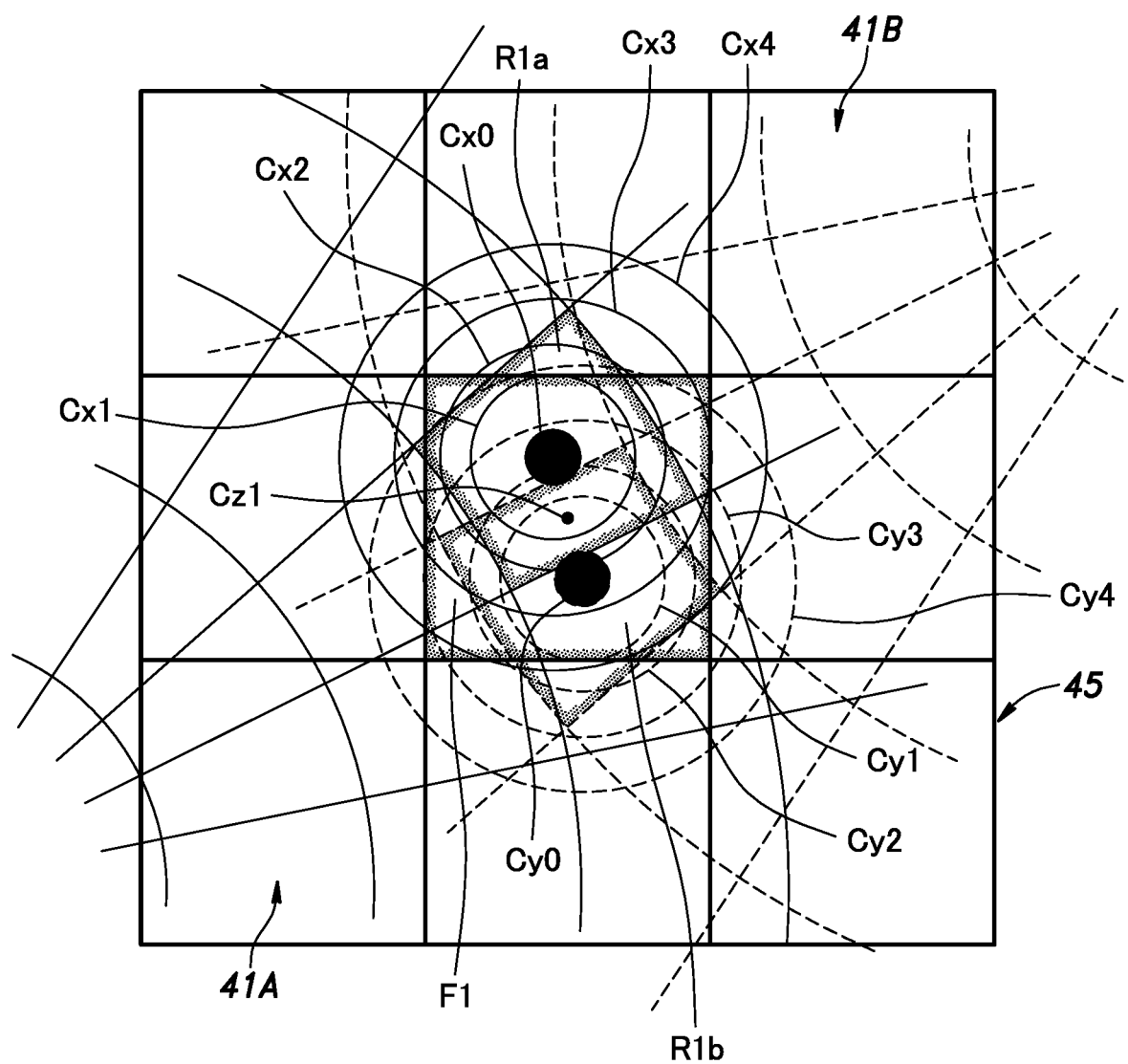
FIG. 6 is an explanatory diagram showing another example of a method of likelihood calculation performed by the object detection device 3 according to the first embodiment.
Figure 7:
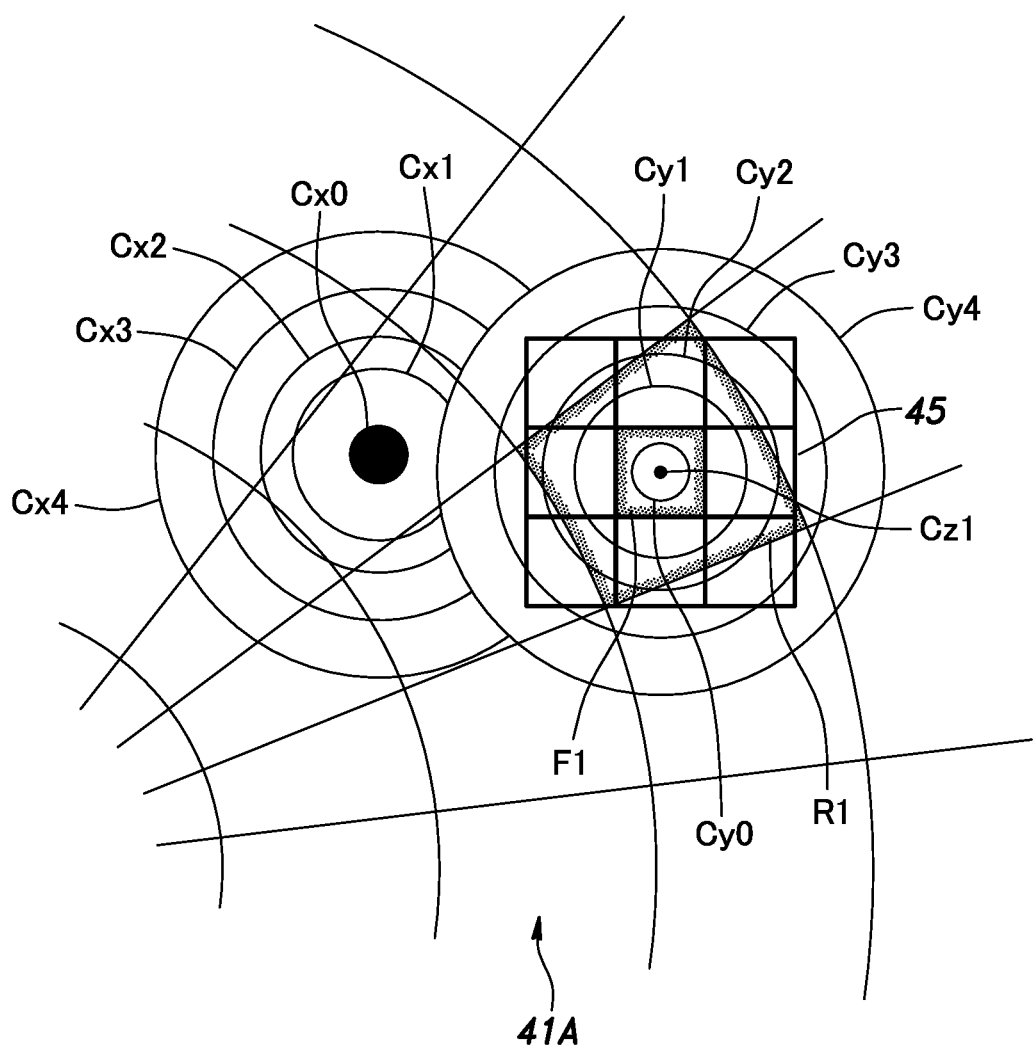
FIG. 7 is an explanatory diagram showing yet another example of a method of likelihood calculation performed by the object detection device 3 according to the first embodiment.

FIGS. 5 to 7 are explanatory diagrams showing examples of methods of likelihood calculation performed by the object detection device 3 according to the first embodiment.

FIG. 5 shows an example of an area related to the radar 2A and extending within a relatively short distance from the radar 2A (which means that the size of a processing cell F is relatively larger than the size of a radar cell R). In this example, it is assumed that the radar cells R1 and R2 of the radar grid 41A have a predetermined measurement value (=1), and their neighboring radar cells have no measurement value (measurement value=0).

Likelihoods associated with the measurement values of the radar cells R1 and R2 are calculated based on the distances from their center points Cx0 and Cy0. In the example of FIG. 5, likelihoods associated with the radar cell R1 are determined between adjoining concentric circles Cx1 to Cx4 around the center point Cx0.

For example, the likelihood at the center point Cx0 is set to the same value as the measurement value (i.e., the likelihood=1); the other likelihoods may be set as follows: the likelihood may be set to 0.8 (i.e. the likelihood=0.8) in the region between the center point Cx0 and the circle Cx1;

the likelihood may be set to 0.6 (i.e. the likelihood=0.6) in the annular region between Cx1 to Cx2; the likelihood may be set to 0.4 (i.e. the likelihood=0.4) in the annular region between Cx2 to Cx3; and the likelihood may be set to 0.2 (i.e. the likelihood=0.2) in the annular region between C3x to Cx4. The likelihood for outside the circle Cx4 may be set to 0. Similarly, the likelihoods associated with the radar cell R2 may be determined between adjoining concentric circles Cy1 to Cy4 around the center point Cy.

The likelihoods are set in this way. Then, for the processing cell F1, the grid value calculator 32 calculates the maximum value of the likelihoods around the center position Cz1 as a grid value (In this case, the likelihood is set to 0.6 as the likelihood is set to 0.6 in the annular region between Cx1 to Cx2 and the likelihood is set to 0.4 in the annular region between Cy2 to Cy3). For the processing cell F2, the grid value calculator 32 can calculate the maximum value of the likelihoods around the center position Cz2 as a grid value (In this case, the likelihood is set to 0.2 in the annular region between Cx3 to Cx4). Grid values of processing cells other than the processing cells F1 and F2 may be set in a similar manner.

In this way, likelihoods associated with measurement values of each radar cell R can be calculated based on distances between each processing cell F and related radar cells R. The distance between each processing cell F and a radar cell R can be easily calculated as the distance between the centers of these processing and radar cells. In the example of FIG. 5, the likelihood varies stepwise, with the distance from the center of the radar cell R (the distance between each radar cell R and a processing cell F). However, the variation of likelihood is not limited to this, and the likelihood may linearly vary, with the distance between each radar cell R and a processing cell F.

In an alternative embodiment, the grid value calculator 32 calculates the maximum value of the likelihoods which are set within the processing cell F1, for example, as a grid value of the processing cell F1. (In the example of FIG. 5, the grid value is the maximum likelihood=1 set for the center points Cx and Cy within the processing cell F1.) (The grid value calculator 32 calculates a grid value of any other processing cell in the same manner.)

Alternatively, the grid value calculator 32 calculates a sum of the likelihoods associated with the center position Cz1, for example, as a grid value of the processing cell F1. (In the example of FIG. 5, the grid value is 1.0 which is a sum of the likelihood of 0.6 in the annular region between Cx1 to Cx2 where the center position Cz1 is present and the likelihood of 0.4 in the annular region between Cy2 to Cy3 where the center position Cz1 is present.) (The grid value calculator 32 calculates a grid value of any other processing cell in the same manner.)

In this way, the object detection system 1 calculates a grid value based on the maximum of likelihood values or a sum of likelihood values for each processing cell, thereby ensuring that a clustering operation can be properly performed on measurement records of the radars 2. It should be noted that the grid value calculator 32 may use, not only the maximum value or a sum of likelihoods, but also other statistical values (such as an average value and an intermediate value) for a plurality of likelihoods.

FIG. 6 shows an example of areas related to the radars 2A and 2B and extending within a relatively short distance from each of the radar 2A and 2B, in a similar manner to the example of FIG. 5. In this example, it is assumed that the radar cell R1$a$ of the radar grid 41A and the radar cell R1$b$ of the radar grid 41B have a predetermined measurement value(=1), and their neighboring radar cells have no measurement value (measurement value=0).

Likelihoods associated with the measurement values of the radar cells R1$a$ and R1$b$ are calculated based on the distances from their center points Cx0 and Cy0 in the same manner as the example in FIG. 5. That is, likelihoods associated with the radar cell R1$a$ are determined between adjoining concentric circles Cx1 to Cx4 around the center point Cx0, while likelihoods associated with the radar cell R1$b$ are determined between adjoining concentric circles Cy1 to Cy4 around the center point Cy0.

The likelihoods are set in this way. Then, for the processing cell F1, the grid value calculator 32 calculates the maximum value of the likelihoods around the center position Cz1 as a grid value (In this case, the likelihood is set to 0.8 as the likelihood is set to 0.8 in the annular region between Cx0 to Cx1). Grid values of processing cells other than the processing cell F1 may be set in a similar manner.

The different methods of likelihood calculation (such as a method using a sum of likelihood or other statistical values) described above with reference to FIG. 5 can also be applied to the example of FIG. 6.

FIG. 7 shows an example of an area located a relatively long distance away from the radar 2A (which means that the size of a processing cell F is relatively smaller than the size of a radar cell R). Likelihoods associated with the measurement value of the radar cell R1 are calculated in the same manner as the example shown in FIG. 5 (or FIG. 6) despite the difference in a relative size of a processing cell F with regard to the radar grid.

For the processing cell F1, for example, the grid value calculator 32 calculates the maximum value of the likelihoods around the center position Cz1 as a grid value (In this case, the likelihood is set to 1.0 as the likelihood is set to 1.0 at the center point Cy0 where the center position Cz1 is present). Grid values of processing cells other than the processing cell F1 may be set in a similar manner.

Figure 8:
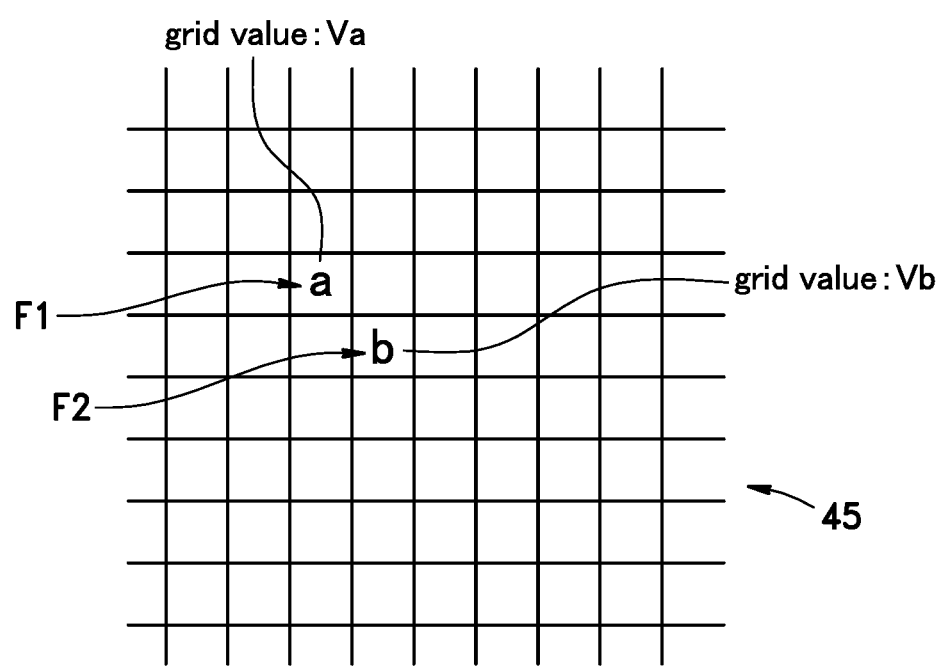
FIG. 8 is an explanatory diagram showing an outline of neighborhood calculation performed by the object detection device 3 according to the first embodiment.

FIG. 8 is an explanatory diagram showing an outline of neighborhood calculation performed by the object detection device 3 according to the first embodiment.

The object detection device 3 can perform neighborhood calculation on a processing cell F1 at the location a and a processing cell F2 at the location b shown in FIG. 8 based on the following equation (1). The neighborhood calculation can be performed on processing cells other than the processing cells F1 and F2 in a similar manner.

$$D(\|a-b\|) \times G(V_a - V_b\|) < \varepsilon \tag{1}$$

where $D(\|a-b\|)$: Distance Between Processing Cells $$G(\|V_a - V_b\|) = k \frac{1}{\sigma\sqrt{2\pi}} e^{\left\{-\frac{(V_a - V_b)^2}{2\sigma^2}\right\}}$$

where a and b are the positions of the processing cells F1 and F2, Va and Vb are grid values of the processing cells F1 and F2 calculated based on the above-mentioned likelihoods, respectively, and G for Va and Vb is a value relating to the difference between the grid values (the distance between the grid values), and G follows the Gaussian distribution as described above. Note that k is a coefficient which is determined as appropriate.

Through the DBSCAN-based algorithm in such neighborhood calculation, a processing cell F to be subjected to the clustering operation is determined as a core point when the processing cell has at least minPts neighboring points (processing cells) which meet the equation (1), and also determined as a point having at least one core point within the radius s when the processing cell has at least one core point (processing cell) which meets the equation (1).

As a result, the neighborhood calculation forms a cluster comprised of a plurality of processing cells F determined to be core points, and processing cells F determined to have a core point within a radius s are further assigned to the cluster.

In this way, the object detection system 1 performs a clustering operation on processing cells based on grid values, the grid values being obtained in relation to likelihoods which are calculated based on distances between each processing cell and related radar cells, thereby ensuring that a proper clustering operation can be performed on measurement records of the radars 2.

Figure 9:
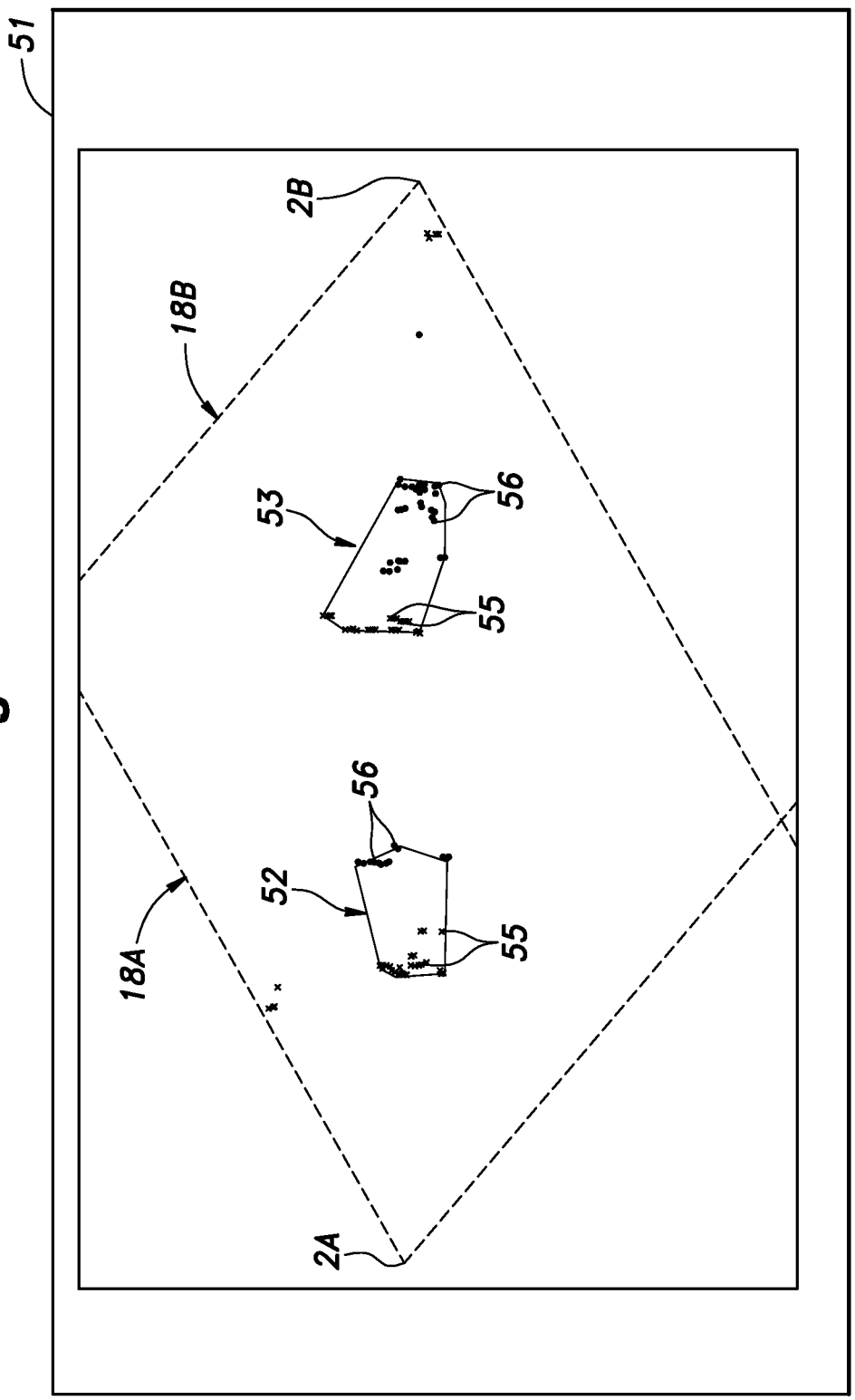
FIG. 9 is an explanatory diagram showing an output of information provided by the object detection device 3 according to the first embodiment.

FIG. 9 is an explanatory diagram showing an output of information (results of clustering operations) provided by the object detection device 3 according to the first embodiment.

As shown in FIG. 9, the object detection device 3 can display the results of clustering operations on a display screen 51 of the information output device 24. FIG. 9 shows an example in which two objects 52 and 53 are detected in the measurement areas 18A and 18B of the radars 2A and 2B. Measurement points 55 (indicated by X in FIG. 9) determined based on the measurement results of the radar 2A are primarily present on the radar 2A side of the objects 52, 53 (the left side in FIG. 9), and measurement points 56 (indicated by black circles in FIG. 9) determined based on the measurement results of the radar 2B are primarily present on the radar 2B side of the objects 52 and 53 (the right side in FIG. 9). Furthermore, regions (polygonal regions in the example) formed by clustering a plurality of measurement points 55 and 56 are shown as the detected objects 52 are 53, respectively, in the display screen 51.

In this way, the object detection system 1 can perform accurate clustering operations based on measurement records of the multiple radars 2A, 2B to thereby provide the operation results (the results of object detection operations).

Figure 10:
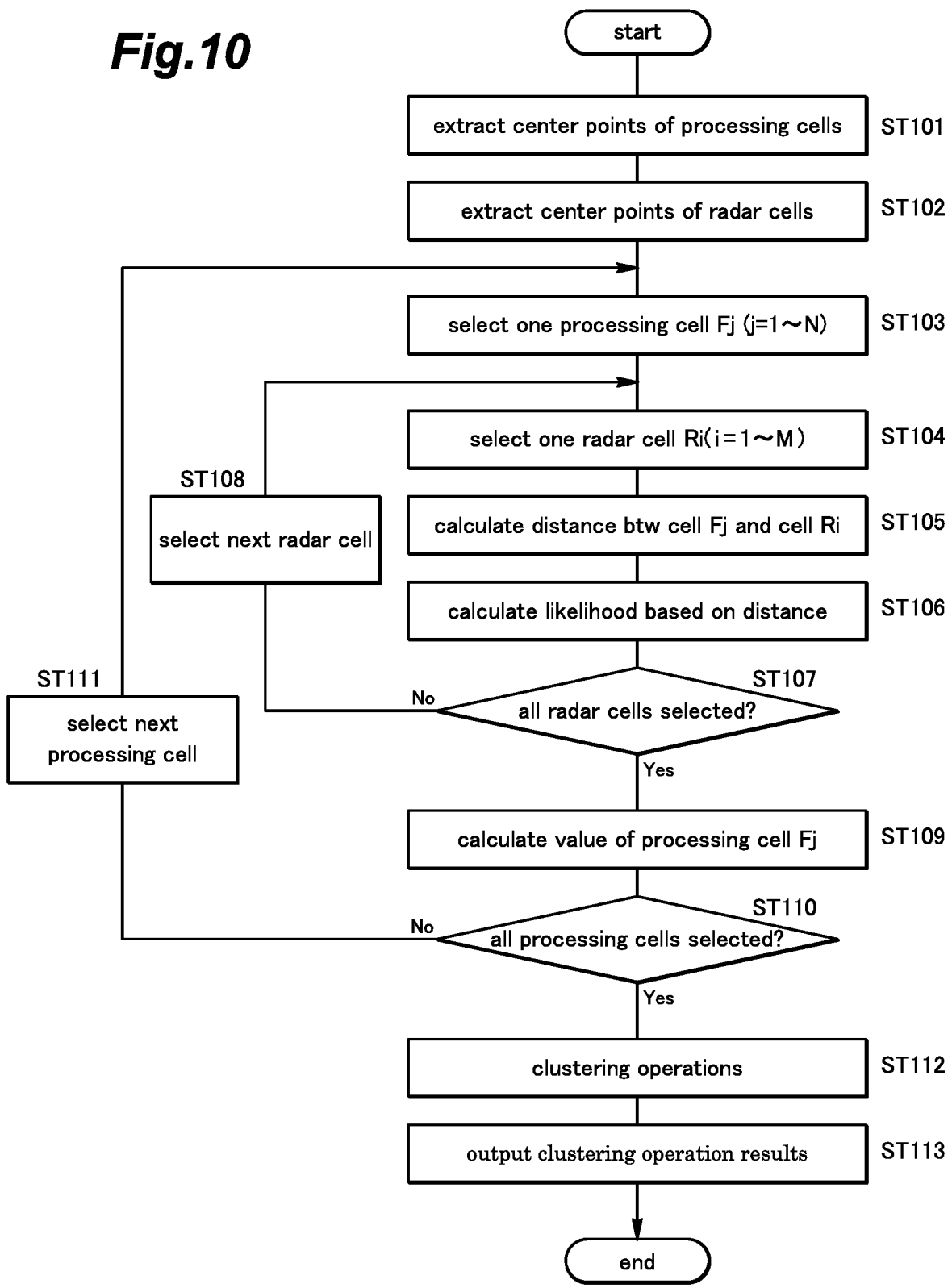
FIG. 10 is a flow chart showing an operation procedure of an object detection operation performed by the object detection device 3 according to the first embodiment.

FIG. 10 is a flow chart showing an operation procedure of an object detection operation performed by the object detection device 3 according to the first embodiment.

In the object detection operation, first, the object detection device 3 extracts the coordinates of the center point of each processing cell and the center point of each radar cell, from the settings data of the processing grids 45 and the radar grids 41 preliminarily stored in the storage 25 (ST101, ST102).

Next, the object detection device 3 selects one of the processing cells Fj (j=1 to N) (ST103), and further selects one of the radar cells Ri (i=1 to M) (ST104). Then, the object detection device 3 calculates the distances between the selected processing cell Fj and the selected radar cell Ri (ST105), and also calculates the likelihood based on the calculated distance (ST106).

Then, the object detection device 3 determines whether selection of all the radar cells Ri has been completed (ST107). If there is a radar cell Ri of which selection has not been completed (No in ST107), the object detection device 3 selects the next radar cell Ri (ST108) and performs the operation in step ST104 again. The object detection device 3 repeatedly performs the processing steps ST104 to ST106 until the selection of all the radar cells Ri is completed. When the measurement records of the plurality of radars 2 are used for the object detection operation, the object detection device 3 selects the radar cells Ri for all the radars 2.

When the selection of all the radar cells Ri is finally completed (Yes in ST107), the object detection device 3 calculates a grid value of each processing cell Fj to be subjected to the clustering operation (clustering target processing cell) based on the likelihoods calculated in step ST106 (ST109). In this case, the object detection device 3 may set the likelihood calculated in step ST106 as a grid value of the processing cell Fj to be subjected to a clustering operation.

Then, the object detection device 3 determines whether or not selection of all the processing cells Fj is completed (ST110). If there is a processing cell Fj of which selection is not completed (No in ST110), the object detection device 3 selects the next processing cell Fj (ST111), and performs the operation in step ST103 again. The object detection device 3 repeatedly performs the processing steps ST103 to ST109 until the selection of all radar cells Ri is completed.

When the selection of all the processing cells Fj is finally completed (Yes in ST110), the object detection device 3 performs the clustering operations on the processing cells Fj (ST112).

Then, the object detection device 3 provides the result of the clustering operations in step ST112 (the results of object detection operations) to the display screen 51 (see FIG. 9) of the information output device 24 (ST113).

Second Embodiment

Figure 11:
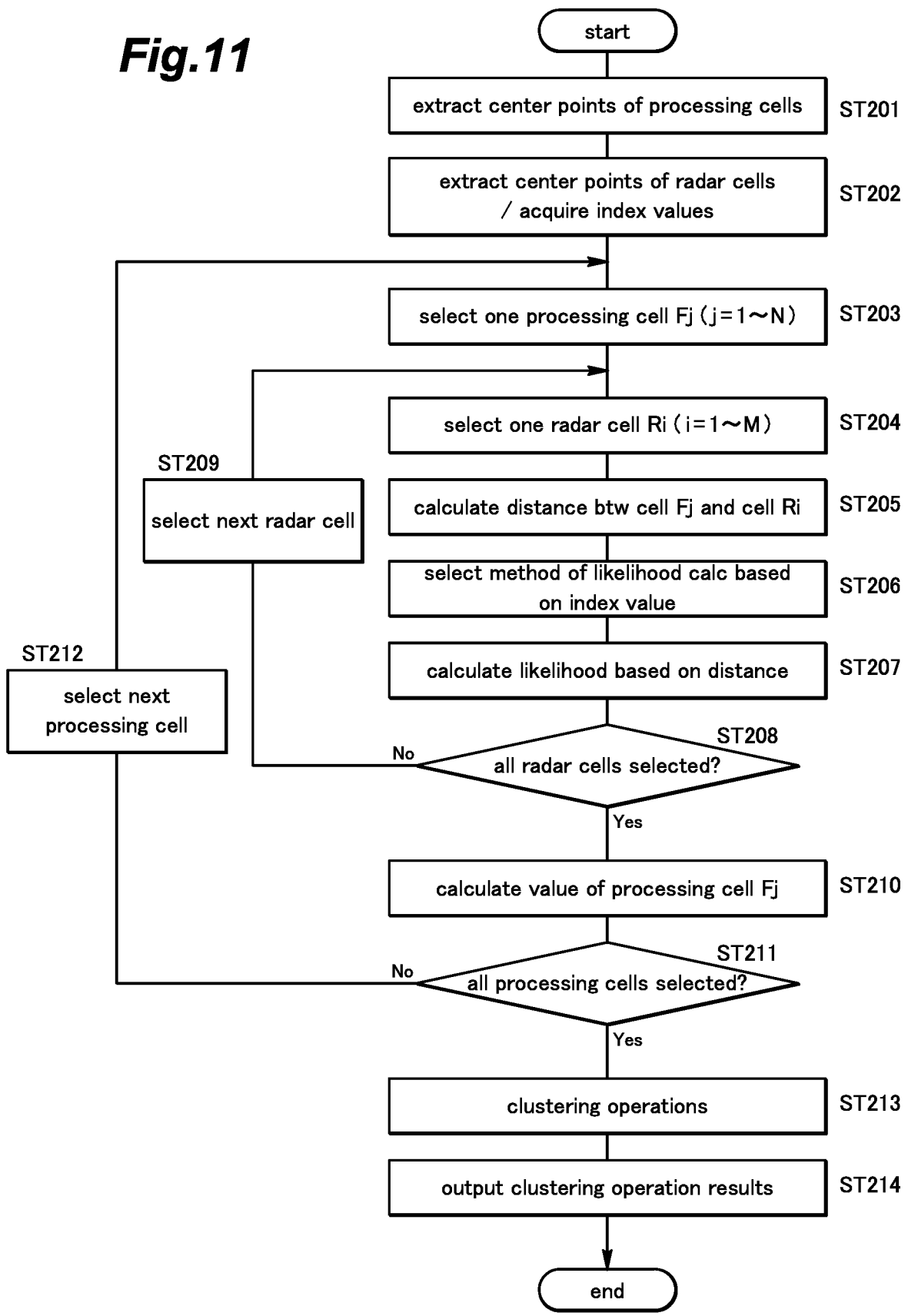
FIG. 11 is a flow chart showing an operation procedure of an object detection operation performed by an object detection device 3 according to a second embodiment of the present invention.
Figure 12:
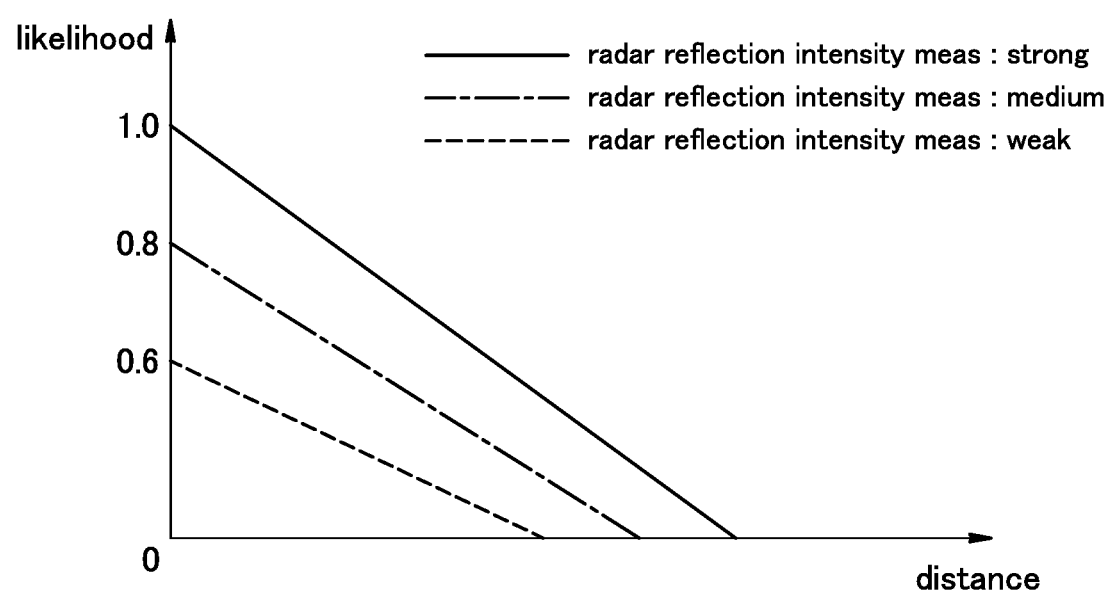
FIG. 12 is an explanatory diagram showing an outline of a selection procedure of methods of likelihood calculation performed in Step ST206 in FIG. 11.

FIG. 11 is a flow chart showing an operation procedure of an object detection operation performed by an object detection device 3 of an object detection system 1 according to a second embodiment of the present invention. FIG. 12 is an explanatory diagram showing an outline of a selection procedure of methods of likelihood calculation performed in Step ST206 in FIG. 11.

In the object detection operation according to the second embodiment, first, the object detection device 3 extracts the center point of each processing cell and that of each radar cell (ST201, ST202) in the same manner as steps ST101 and ST102 shown in FIG. 10. However, in step ST202, the object detection device 3 acquires, for each radar cell, an index value used for selecting a likelihood calculation method described later. Examples of such index values include radar reflection intensity measurements and radar Doppler velocities associated with the respective radar cells.

Subsequent steps ST203 to ST205 are the same as steps ST103 to ST105 shown in FIG. 10. Then, the object detection device 3 selects a method of likelihood calculation based on the index value acquired in step ST202 (ST206).

In step ST206, as an example shown in FIG. 12, the object detection device 3 can select a method of likelihood calculation using a radar reflection intensity measurement as an index value. In this case, the relationship between the distance (horizontal axis) calculated in step ST205 and the likelihood (vertical axis) calculated in step ST207 described below varies according to radar reflection intensity measurements (preset levels of "strong", "medium", and "weak"). That is, when the radar reflection intensity measurement of a radar cell is "strong", the object detection device 3 selects a method of likelihood calculation in which the likelihood, which is calculated in step ST207, decreases from a maximum value of 1, with the distance from the radar cell. Similarly, when the radar reflection intensity measurement of a radar cell is "medium" or "weak", the object detection device 3 selects a method of likelihood calculation in which the likelihood, which is calculated in step ST207, decreases from a maximum value of 0.8 or 0.6, respectively, with the distance from the radar cell.

The relationship between the distance and the likelihood according to an index value is not limited to that shown in FIG. 12, and various relationships may be adopted. Similarly, when a radar Doppler velocity is selected as an index value, a method of likelihood calculation (the relationship between the distance and the likelihood) may be selected according to radar Doppler velocities.

Then, in step ST207, the object detection device 3 uses the method of likelihood calculation selected in step ST206 (for example, a straight-line equation that corresponds to the radar reflection intensity measurement, "strong" in FIG. 12) to thereby calculate the likelihood which varies according to the distance from the radar cell.

In this way, the object detection system 1 enables proper calculation of likelihoods associated with measurements of radar cells based on a prescribed index (such as radar reflection intensity measurement or radar Doppler velocity).

Subsequent steps ST208 to ST214 are the same as steps ST107 to ST113 shown in FIG. 10.

Third Embodiment

Figure 13:
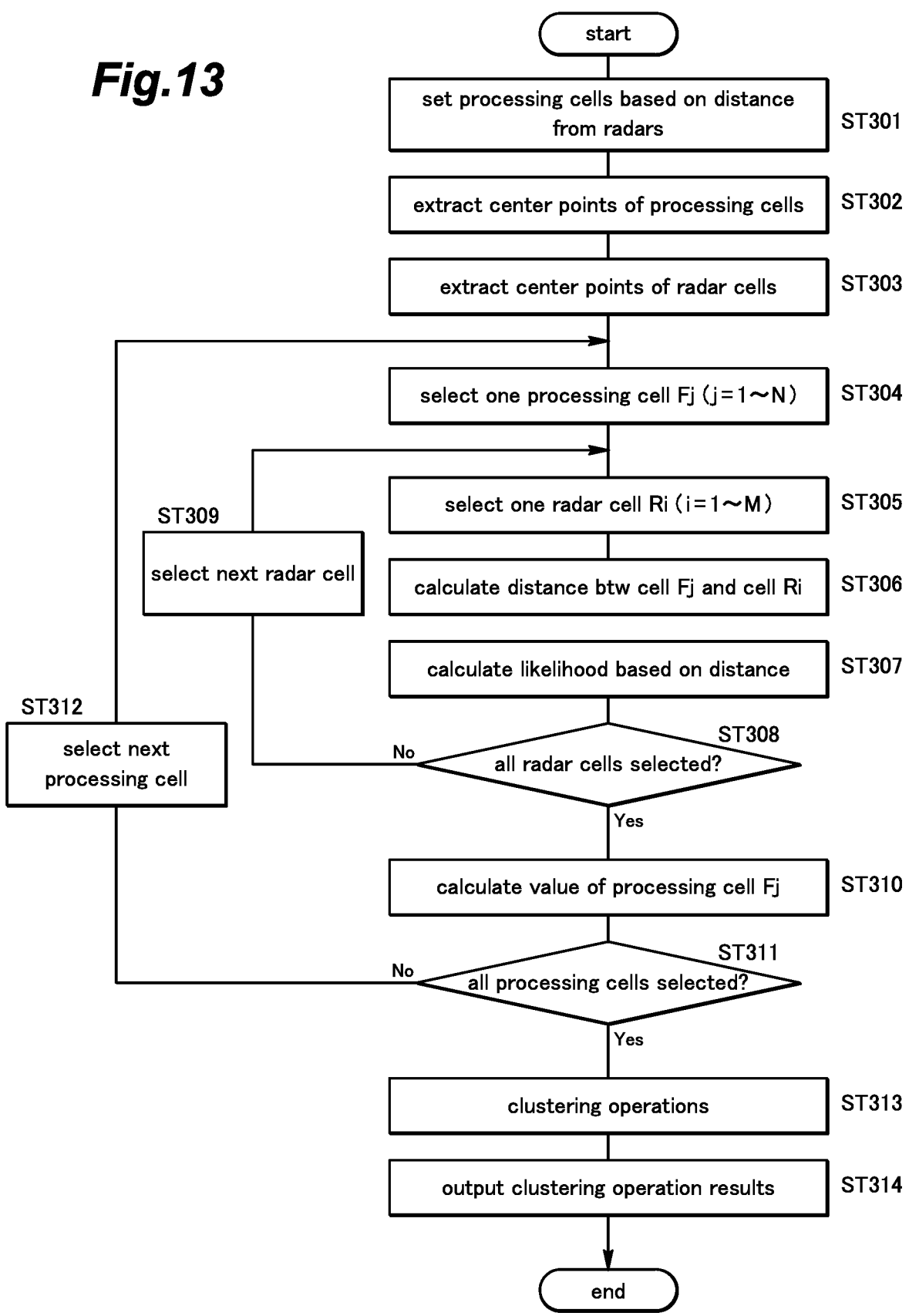
FIG. 13 is a flow chart showing an operation procedure of an object detection operation performed by an object detection device 3 according to a third embodiment of the present invention.
Figure 14:
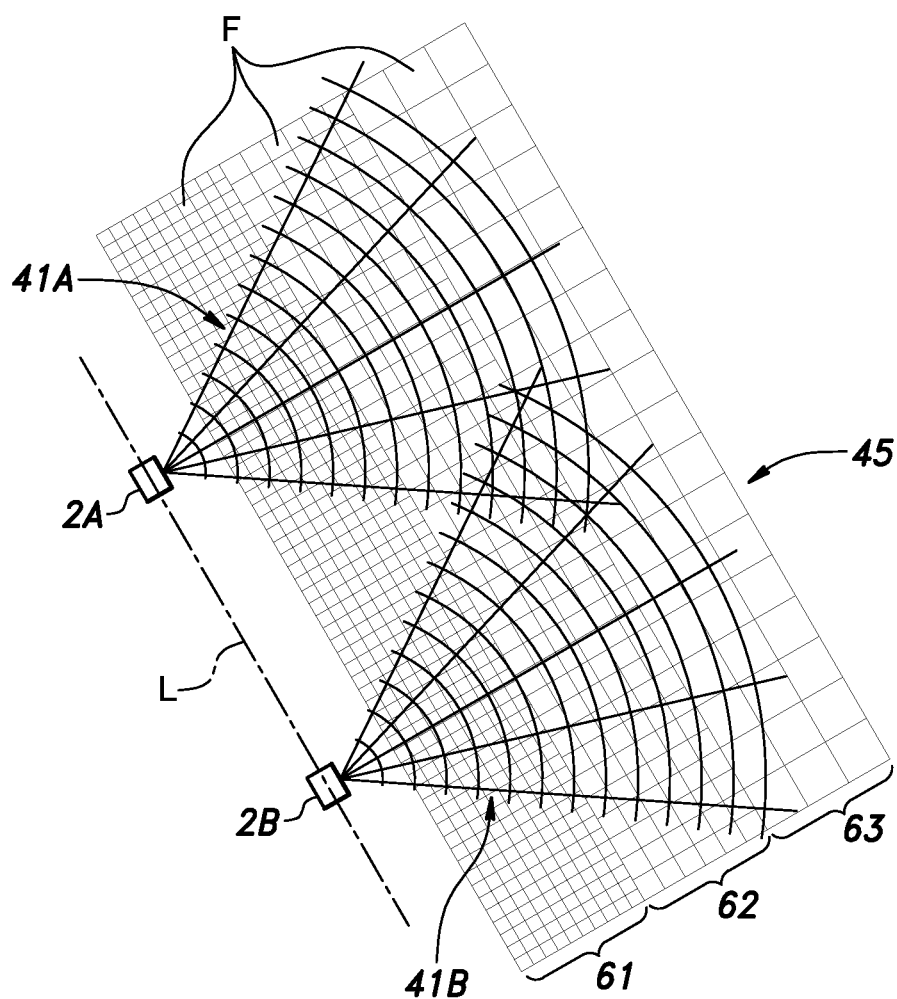
FIG. 14 is an explanatory diagram showing an outline of a method of setting a grid performed in Step ST301 in FIG. 13.

FIG. 13 is a flow chart showing an operation procedure of an object detection operation performed by an object detection device 3 of an object detection system 1 according to a third embodiment of the present invention. FIG. 14 is an explanatory diagram showing an outline of a method of setting a grid performed in Step ST301 in FIG. 13. Except for what will be discussed here, the object detection system 1 of the third embodiment is the same as the first and second embodiments, of which no further explanation will be made.

In the object detection system 1 according to the third embodiment, as shown in FIG. 14, a plurality of radars (in this case, radars 2A and 2B) are arranged side by side so as to have a same reference emission direction, and similarly, radar grids 41A and 41B (measurement areas) are also formed in the same direction.

In the object detection operation, first, the object detection device 3 sets a processing grid 45 such that processing cells F forming the processing grid 45 increase in size with distances from the radars 2A and 2B (ST301).

More specifically, as shown in FIG. 14, the orthogonal coordinates of the processing grid 45 are determined based on a virtual straight line L on which the two radars 2A and 2B are located such that the processing cells F increase in size with distances from the virtual straight line L (ST301). In this example, the processing cells F have three different sizes in the areas 61 to 63 arranged in order from the virtual straight line L. However, the pattern of variation in the size of the processing cells is not limited to this pattern. For example, the processing cells F arranged parallel to the virtual straight line L in a row may have different sizes for each row of the processing cells.

Steps ST302 to ST314 are the same as steps ST101 to ST113 shown in FIG. 10.

In this way, the object detection system 1 of the third embodiment, in which a plurality of radars 2A and 2B are arranged side by side so as to have a same reference emission direction, enables proper setting of radar grids 41A, 41B of the radars 2A, 2B and a processing grid 45 for clustering operation.

While specific embodiments of the present invention are described herein for illustrative purposes, the present invention is not limited to those specific embodiments. In the object detection devices, the object detection systems and the object detection methods of the above-described embodiments, not all elements therein are essential. Thus, various modifications including omissions may be made for the elements of the embodiments as appropriate without departing from the scope of the invention

INDUSTRIAL APPLICABILITY

An object detection device, an object detection system, and an object detection method according to the present invention achieve an effect of ensuring that a clustering operation can be properly performed on measurement records of radars, and are useful as an object detection device, an object detection system, and an object detection method for detecting an object based on measurement records of one or more radars.

GLOSSARY

1 object detection system
2 radar
2A radar
2B radar
3 object detection device
11 vehicle
12 pedestrian
15 crossroad
16A, 16B roadside apparatus
18A, 18B measurement area
21 communication device
22 input device
23 controller
24 information output device
25 storage
31 grid setter
32 grid value calculator
33 cluster generator
41 radar grid
45 processing grid
51 display screen
52, 53 object
55, 56 measurement point

The invention claimed is:

1. An object detection device, comprising:
a communication device configured to perform a first operation for acquirin measurement records of one or more radars,
a processor configured to perform a second operation for detecting an object based on the measurement records of the one or more radars,
wherein the processor is configured to:
acquire settings data for one or more radar grids for measurement, the settings data including location data of cells in the one or more radar grids, each radar grid being set for a measurement area of a corresponding one of the one or more radars and consisting of a plurality of radar cells;
performing clustering operations to define a processing grid, the processing grid being set based on the measurement area of each radar grid and consisting of a plurality of processing cells;
calculate, for each processing cell, one or more likelihood values associated with measurements of one or more radar cells overlapped with the processing cell based on distances between the processing cell and the one or more radar cells, wherein each likelihood value is determined such that a maximum value is a center point of each of the one or more radar cells and the likelihood value decreases with a distance from the center point of each of the one or more radar cells;

calculate a grid value of each of the processing cells based on the one or more likelihood values; and perform a clustering operation on each processing cell based on at least one of (i) distances between the processing cell and one or more different processing cells, or (ii) the grid value of the processing cell and grid values of the one or more different processing cells.

2. The object detection device according to claim 1, wherein the processor is further configured such that, when a plurality of likelihood values are calculated for a processing cell based on the distances between the processing cell and the one or more radar cells, the processor calculates the maximum value of the one or more likelihood values as the grid value of the processing cell.

3. The object detection device according to claim 1, wherein the processor is further configured such that, when a plurality of likelihood values are calculated, for a processing cell, based on the distances between the processing cell and the one or more radar cells, the processor calculates a sum of the one or more likelihood values as the grid value of the processing cell.

4. The object detection device according to claim 1, wherein the processor is further configured to calculate the one or more likelihood values associated with the measurements of the one or more radar cells overlapped with the processing cell based on radar reflection intensity measurements associated with the respective radar cells.

5. The object detection device according to claim 1, wherein the processor is further configured to calculate the one or more likelihood values associated with the measurements of the one or more radar cells overlapped with the processing cell based on radar Doppler velocities associated with the respective radar cells.

6. The object detection device according to claim 1, wherein the processor is further configured to perform the clustering operation based on a difference between two grid values of a pair of processing cells to be subjected to the clustering operation.

7. The object detection device according to claim 1, wherein a distance between the processing cell and each radar cell of the one or more radar cells overlapped with the processing cell is between centers of the radar cell and the processing cell.

8. The object detection device according to claim 1, wherein each radar grid is formed based on polar coordinates, and wherein the processing grid is formed based on orthogonal coordinates.

9. An object detection system comprising:
the object detection device according to claim 1; and
the one or more radars.

10. The object detection system according to claim 9, wherein the one or more radars are installed on roads.

11. The object detection system according to claim 9, wherein the one or more radars consist of a plurality of radars arranged side by side so as to have a same reference emission direction, and
wherein the plurality of processing cells forming the processing grid increase in size with distance from the one or more radars in the measurement area of each radar grid.

12. An object detection method performed by an object detection device, the object detection device including a communication device configured to perform a first operation for acquiring measurement records of one or more radars and a processor configured to perform a second operation for detecting an object based on the measurement records of the one or more radars, the object detection method comprising:
acquiring settings data for one or more radar grids for measurement, the settings data including location data of cells in the one or more radar grids, each radar grid being set for a measurement area of a corresponding one of the one or more radars and consisting of a plurality of radar cells;
performing clustering operations to define a processing grid, the processing grid being set based on the measurement area of each radar grid and consisting of a plurality of processing cells;
calculating, for each processing cell, one or more likelihood values associated with measurements of one or more radar cells overlapped with the processing cell based on distances between the processing cell and the one or more radar cells, wherein each likelihood value is determined such that a maximum value is a center point of each of the one or more radar cells and the likelihood value decreases with a distance from the center point of each of the one or more radar cells:
calculating a grid value of each of the processing cells based on the one or more likelihood values; and
performing a clustering operation on each processing cell based on at least one of (i) distances between the processing cell and one or more different processing cells, or (ii) the grid value of the processing cell and grid values of the one or more different processing cells.

* * * * *